US010539057B2

(12) United States Patent
VanVuuren et al.

(10) Patent No.: US 10,539,057 B2
(45) Date of Patent: Jan. 21, 2020

(54) INJECTOR FOR REDUCTANT DELIVERY UNIT HAVING REDUCED FLUID VOLUME

(71) Applicant: Continental Automotive Systems, Inc., Auburn Hills, MI (US)

(72) Inventors: Willem Nicolaas VanVuuren, Yorktown, VA (US); Stephen C Bugos, Poquoson, VA (US); Michael J Hornby, Williamsburg, VA (US); Douglas Edward Cosby, Newport News, VA (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 168 days.

(21) Appl. No.: 15/704,268

(22) Filed: Sep. 14, 2017

(65) Prior Publication Data
US 2019/0078485 A1 Mar. 14, 2019

(51) Int. Cl.
*F01N 3/20* (2006.01)
*B01D 53/94* (2006.01)
*F02M 51/06* (2006.01)

(52) U.S. Cl.
CPC ........... *F01N 3/2066* (2013.01); *B01D 53/94* (2013.01); *F01N 2610/02* (2013.01);
(Continued)

(58) Field of Classification Search
CPC .... F01N 3/2066; F01N 3/208; F01N 2910/02; F01N 2910/1426; F01N 2910/1453;
(Continued)

(56) References Cited

U.S. PATENT DOCUMENTS 4,957,085 A * 9/1990 Sverdlin .............. F02M 47/043
123/41.31
5,794,856 A * 8/1998 Nally .................. F02M 69/047
239/408

(Continued)

FOREIGN PATENT DOCUMENTS

DE 102008042987 A1 4/2010

OTHER PUBLICATIONS

International Search Report and Written Opinion for PCT, dated Nov. 16, 2018, for counterpart PCT application PCT/US2018/051117.

(Continued)

*Primary Examiner* — Steven J Ganey
*Assistant Examiner* — Joseph A Greenlund

(57) ABSTRACT

An RDU fluid injector includes a fluid inlet and a fluid outlet; a fluid path; an actuator unit including a pole piece, a movable armature and a coil; a valve assembly including a valve seat and a seal member connected to the armature and engageable with the valve seat; and a volume reduction member upstream of the actuator unit. The volume reduction member includes a throughbore partly defining the fluid path. The actuator unit, the valve assembly and the volume reduction member are disposed in one or more body portions of the injector, wherein each of the actuator unit, the valve assembly, the volume reduction member and the one or more body portions includes one or more components of the fluid injector. A ratio of a volume of the fluid path to a volume of the components of the fluid injector is between 0.08 and 0.30.

20 Claims, 5 Drawing Sheets

(52) U.S. Cl.
CPC ........... *F01N 2610/1453* (2013.01); *F01N 2610/1486* (2013.01); *F02M 51/0682* (2013.01); *F02M 2200/505* (2013.01)

(58) Field of Classification Search
CPC ........... F01N 2910/1486; B01D 53/94; F02M 51/0682; F02M 61/165; F02M 2200/505; F02M 2200/8061
USPC ..................... 239/569, 533.3, 585.1, 900
See application file for complete search history.

(56) References Cited

U.S. PATENT DOCUMENTS

| | | | | |
|---|---|---|---|---|
| 6,264,112 B1* | 7/2001 | Landschoot | F02M 51/0667 | 239/5 |
| 6,325,049 B1* | 12/2001 | Nally | F02M 61/14 | 123/470 |
| 6,676,044 B2 | 1/2004 | Dallmeyer | F02M 51/005 | 239/585.1 |
| 6,685,112 B1* | 2/2004 | Hornby | F02M 51/0664 | 239/533.2 |
| 7,296,781 B2* | 11/2007 | Akabane | F02M 51/0657 | 239/585.1 |
| 7,389,952 B2* | 6/2008 | Dallmeyer | F02M 51/005 | 239/585.1 |
| 7,429,006 B2* | 9/2008 | Dallmeyer | F02M 51/005 | 239/585.1 |
| 7,481,049 B2* | 1/2009 | Huber | F01N 3/2066 | 239/128 |
| 7,506,826 B2* | 3/2009 | Miller | B05B 1/302 | 239/585.1 |
| 7,552,880 B2* | 6/2009 | Dallmeyer | F02M 51/0682 | 239/533.14 |
| 7,617,605 B2* | 11/2009 | Fochtman | B23K 26/0823 | 123/470 |
| 7,617,991 B2* | 11/2009 | Wells | F02M 61/165 | 239/5 |
| 7,673,818 B2* | 3/2010 | Akabane | F02M 51/0614 | 239/585.1 |
| 7,721,713 B2* | 5/2010 | Hayatani | F02M 51/0685 | 123/467 |
| 7,798,131 B2* | 9/2010 | Hornby | F02M 51/061 | 123/491 |
| 7,832,660 B2* | 11/2010 | Imoehl | F02M 61/168 | 239/533.12 |
| 7,866,577 B2* | 1/2011 | Yoshimaru | F02M 51/0682 | 239/533.12 |
| 7,931,217 B2* | 4/2011 | Matsusaka | F02M 61/168 | 239/585.1 |
| 8,002,287 B2* | 8/2011 | Wagner | F16L 5/10 | 277/551 |
| 8,037,868 B2* | 10/2011 | Kannan | F02M 55/004 | 123/456 |
| 8,087,239 B2* | 1/2012 | Bugos | F01N 3/2066 | 60/298 |
| 8,215,573 B2* | 7/2012 | Hornby | F02M 51/0671 | 239/5 |
| 8,347,605 B2* | 1/2013 | Bugos | F01N 3/0821 | 60/286 |
| 8,646,704 B2* | 2/2014 | Yamamoto | F02M 51/0675 | 239/533.9 |
| 8,740,113 B2* | 6/2014 | Roessle | F01N 3/2066 | 239/585.1 |
| 8,857,743 B2* | 10/2014 | Shingu | F02M 51/0685 | 239/585.1 |
| 8,973,895 B2* | 3/2015 | Thomas | F01N 3/2066 | 251/129.21 |
| 8,997,463 B2* | 4/2015 | Bugos | B01D 53/90 | 60/286 |
| 8,998,114 B2* | 4/2015 | Olivier | F01N 3/2066 | 239/585.1 |
| 9,033,264 B2* | 5/2015 | Stier | F02M 61/168 | 239/533.2 |
| 9,273,581 B2* | 3/2016 | Van Vuuren | F01N 3/208 | |
| 9,422,901 B2* | 8/2016 | Suzuki | F02M 51/0685 | |
| 9,587,603 B2* | 3/2017 | Hanjagi | F02M 37/0029 | |
| 9,683,472 B2* | 6/2017 | Thomas | F01N 3/2066 | |
| 9,777,859 B2* | 10/2017 | van Vuuren | F16K 27/00 | |
| 2003/0094513 A1* | 5/2003 | Luft | F02M 51/0671 | 239/533.9 |
| 2005/0023383 A1* | 2/2005 | Morton | F02M 51/0664 | 239/585.1 |
| 2005/0173869 A1* | 8/2005 | Wagner | F16L 5/10 | 277/602 |
| 2007/0057095 A1* | 3/2007 | Bayer | F02M 51/0667 | 239/585.1 |
| 2007/0095745 A1* | 5/2007 | Sebastian | F02M 51/0667 | 210/439 |
| 2007/0114299 A1* | 5/2007 | Scheffel | F02M 51/0657 | 239/88 |
| 2007/0194152 A1* | 8/2007 | Abe | F02M 51/0653 | 239/585.2 |
| 2009/0184184 A1* | 7/2009 | Schwegler | F02M 51/0671 | 239/585.1 |
| 2010/0213286 A1* | 8/2010 | Grandi | F02M 51/061 | 239/575 |
| 2010/0264229 A1* | 10/2010 | Facchin | F02M 51/0671 | 239/1 |
| 2011/0192140 A1 | 8/2011 | Oliver | | |
| 2011/0309166 A1 | 12/2011 | Thomas et al. | | |
| 2013/0026257 A1* | 1/2013 | Jalal | F02M 51/0603 | 239/585.5 |
| 2013/0061578 A1* | 3/2013 | Van Vuuren | F01N 3/2066 | 60/295 |
| 2014/0001290 A1* | 1/2014 | Nishida | F02M 61/10 | 239/585.1 |
| 2014/0008468 A1* | 1/2014 | Graner | F02M 51/0682 | 239/585.1 |
| 2014/0054394 A1* | 2/2014 | Bugos | F01N 3/10 | 239/132.3 |
| 2014/0075923 A1* | 3/2014 | Hodgson | F01N 3/2066 | 60/282 |
| 2014/0138568 A1* | 5/2014 | van Vuuren | F16K 27/00 | 251/357 |
| 2015/0059322 A1* | 3/2015 | Bugos | F01N 3/2066 | 60/298 |
| 2015/0115051 A1* | 4/2015 | Van Vuuren | F01N 3/208 | 239/1 |
| 2015/0369176 A1* | 12/2015 | Ittlinger | B01D 29/56 | 239/575 |
| 2018/0058291 A1* | 3/2018 | Bugos | F01N 3/2066 | |
| 2018/0179938 A1* | 6/2018 | Shaull | F02M 61/162 | |
| 2019/0078482 A1* | 3/2019 | Cosby | F01N 3/208 | |
| 2019/0078485 A1* | 3/2019 | VanVuuren | F01N 3/2066 | |
| 2019/0078486 A1* | 3/2019 | Hatfield | F01N 3/2066 | |
| 2019/0078487 A1* | 3/2019 | Hatfield | F01N 3/2066 | |
| 2019/0078488 A1* | 3/2019 | Hatfield | F01N 3/2066 | |

OTHER PUBLICATIONS

File history of U.S. Appl. No. 151704,294, including non-final Office Action dated Apr. 4, 2019.

* cited by examiner

INJECTOR FOR REDUCTANT DELIVERY UNIT HAVING REDUCED FLUID VOLUME

CROSS-REFERENCE TO RELATED APPLICATIONS

The present application is related to U.S. patent application Ser. No. 15/704,294, filed Sep. 24, 2017, and titled, "INJECTOR FOR REDUCTANT DELIVERY UNIT HAVING FLUID VOLUME REDUCTION ASSEMBLY"; U.S. patent application Ser. No. 15/704,331, filed Sep. 24, 2017, and titled, "SEAL MEMBER FOR REDUCTANT DELIVERY UNIT"; and U.S. patent application Ser. No. 15/704,402, filed Sep. 24, 2017, and titled, "INJECTOR FOR REDUCTANT DELIVERY UNIT HAVING FLUID VOLUME REDUCTION ASSEMBLY", the content of the above applications are hereby incorporated by reference herein in their entirety.

FIELD OF INVENTION

The present invention generally relates to a fluid injector of a reductant delivery unit (RDU), and particularly to a robust RDU fluid injector for non-purge applications.

BACKGROUND

Emissions regulations in Europe and North America are driving the implementation of new exhaust aftertreatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide emissions (NOx) that are difficult to treat in oxygen-rich exhaust environments characteristic of lean-burn combustion. Exhaust aftertreatment technologies are currently being developed that treat NOx under these conditions.

One of these technologies includes a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR). Ammonia is difficult to handle in its pure form in the automotive environment, therefore it is customary with these systems to use a diesel exhaust fluid (DEF) and/or liquid aqueous urea solution, typically at a 32% concentration of urea ($CO(NH_2)_2$). The solution is referred to as AUS-32, and is also known under its commercial name of AdBlue. The reductant solution is delivered to the hot exhaust stream typically through the use of an injector, and is transformed into ammonia prior to entry in the catalyst. More specifically, the solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$), the ammonia resulting from the thermolysis and the hydrolysis then undergoes a catalyzed reaction with the nitrogen oxides as described previously.

AUS-32, or AdBlue, has a freezing point of −11 C, and system freezing is expected to occur in cold climates. Since these fluids are aqueous, volume expansion happens after the transition to the solid state upon freezing. The expanding solid can exert significant forces on any enclosed volumes, such as an injector. This expansion may cause damage to the injection unit, so different SCR strategies exist for addressing reductant expansion.

There are two known SCR system strategies in the marketplace: purge systems and non-purge systems. In purge SCR systems, the reductant urea and/or DEF solution is purged from the RDU when the vehicle engine is turned off. In non-purge SCR systems, the reductant remains in the RDUs throughout the life of the vehicle. During normal operation of a non-purge SCR system, the RDU injector operates at temperatures which are above the freezing point of the reductant such that reductant in the RDU remains in the liquid state. When the vehicle engine is turned off in the non-purge SCR system, however, the RDU injector remains filled with reductant, thereby making the RDU injector susceptible to damage from reductant expanding in freezing conditions.

SUMMARY

Example embodiments overcome shortcomings found in existing RDU fluid injectors and provide an improved fluid injector for non-purge SCR systems in which the adverse effects from the RDU being in temperatures that are below the freezing point of reductant are reduced. According to an example embodiment, a reductant delivery unit includes a fluid injector having a fluid inlet disposed at a first end of the fluid injector for receiving a reductant, and a fluid outlet disposed at a second end of the fluid injector for discharging the reductant, the fluid injector defining a fluid path from the fluid inlet to the fluid outlet. The fluid injector includes an actuator unit, including a pole piece disposed in a fixed position within the fluid injector, a movable armature and a coil disposed in proximity to the pole piece and the movable armature; and a valve assembly including a valve seat disposed at or in proximity with the second end of the fluid injector and a seal member connected to the armature and engageable with the valve seat. The fluid injector further includes a volume reduction member disposed between the actuator unit and the fluid inlet, the volume reduction member including a bore defined through the volume reduction member, the bore partly defining the fluid path through the fluid injector. The actuator unit, the valve assembly and the volume reduction member are disposed in one or more injector body portions. In an example embodiment, each of the actuator unit, the valve assembly, the volume reduction member and the one or more injector body portions includes one or more components of the fluid injector, and a ratio of a volume of the fluid path to a volume of the components of the fluid injector is between 0.08 and 0.30.

The armature assembly further includes a pin member connected between the armature and the seal member of the valve assembly, and the one or more injector body portions includes a valve body portion in which the valve assembly is at least partly disposed. An outer surface of the pin member and an inner surface of the valve body portion partly define the fluid path of the fluid injector, the fluid path not passing through the pin member.

The pin member includes an upstream end portion and a downstream end portion, relative to a direction of reductant flow in the fluid path of the fluid injector. The armature includes a pocket and one or more channels defined through the armature from an interior of the pocket to the upstream end portion of the pin member. The pocket and the one or more channels define the fluid path of the fluid injector through the armature.

The actuator unit further includes a spring disposed at least partly in the pocket of the armature, and a spring adjustment member having a first end contacting the spring and a second end contacting a downstream end of the volume reduction member. The spring adjustment member includes a throughbore partly defining the fluid path of the fluid injector.

The volume reduction member includes a throughbore defining the fluid path through the volume reduction member. The throughbore of the volume reduction member is in fluid communication with the throughbore of the spring adjustment member. The fluid injector further includes a filter disposed between the fluid inlet and the volume reduction member, and a retaining ring disposed upstream of the filter, the filter and the retaining ring constituting components of the fluid injector. The fluid injector further includes a tube member in which the filter and volume reduction member are disposed, the retaining ring being welded to the tube member.

The fluid injector may further include an elastic member disposed between and contacting the volume reduction member and the pole piece.

In an example embodiment, the actuator unit further includes a spring having a first end contacting the armature and a second end, and a spring adjustment member having a first end contacting the second end of the spring and a second end contacting a downstream end of the volume reduction member. The spring adjustment member may include a throughbore partly defining the fluid path of the fluid injector, the elastic member surrounding a portion of the spring adjustment member.

The reductant delivery unit further includes one or more shield members disposed around the fluid injector. In an example embodiment, the ratio of the volume of the fluid path to the volume of the components of the fluid injector is between 0.12 and 0.20.

BRIEF DESCRIPTION OF THE DRAWINGS

Aspects of the invention will be explained in detail below with reference to an exemplary embodiment in conjunction with the drawings, in which.

DETAILED DESCRIPTION

The following description of the example embodiment(s) is merely exemplary in nature and is in no way intended to limit the invention, its application, or uses.

Example embodiments are generally directed to an RDU for a non-purge SCR system in which damaging effects from a reductant, DEF and/or urea solution freezing in the RDU injector are reduced.

Figure 1:
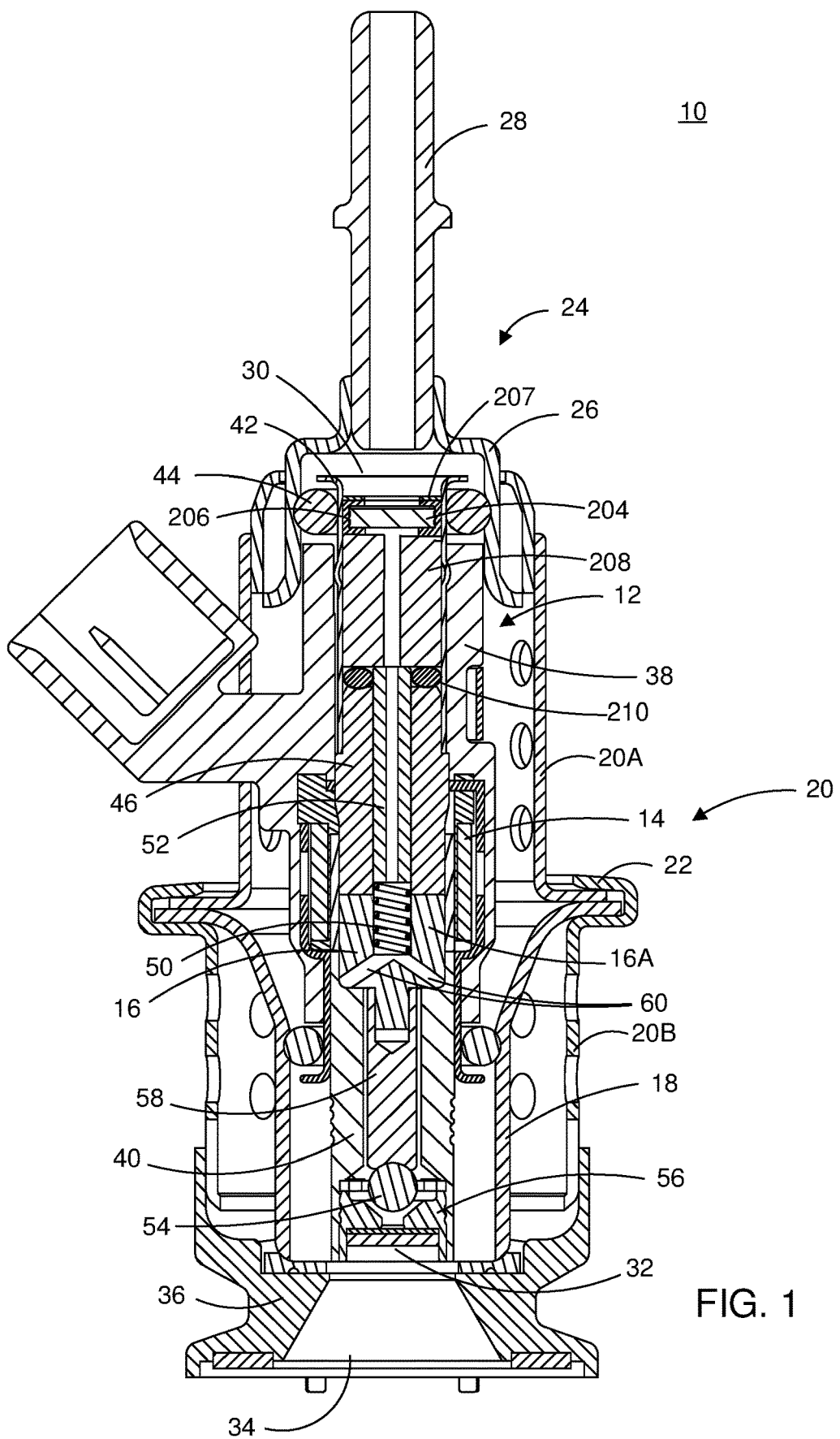
FIG. 1 is a cross-sectional side view of an RDU for a non-purge SCR system according to an example embodiment.
Figure 2:
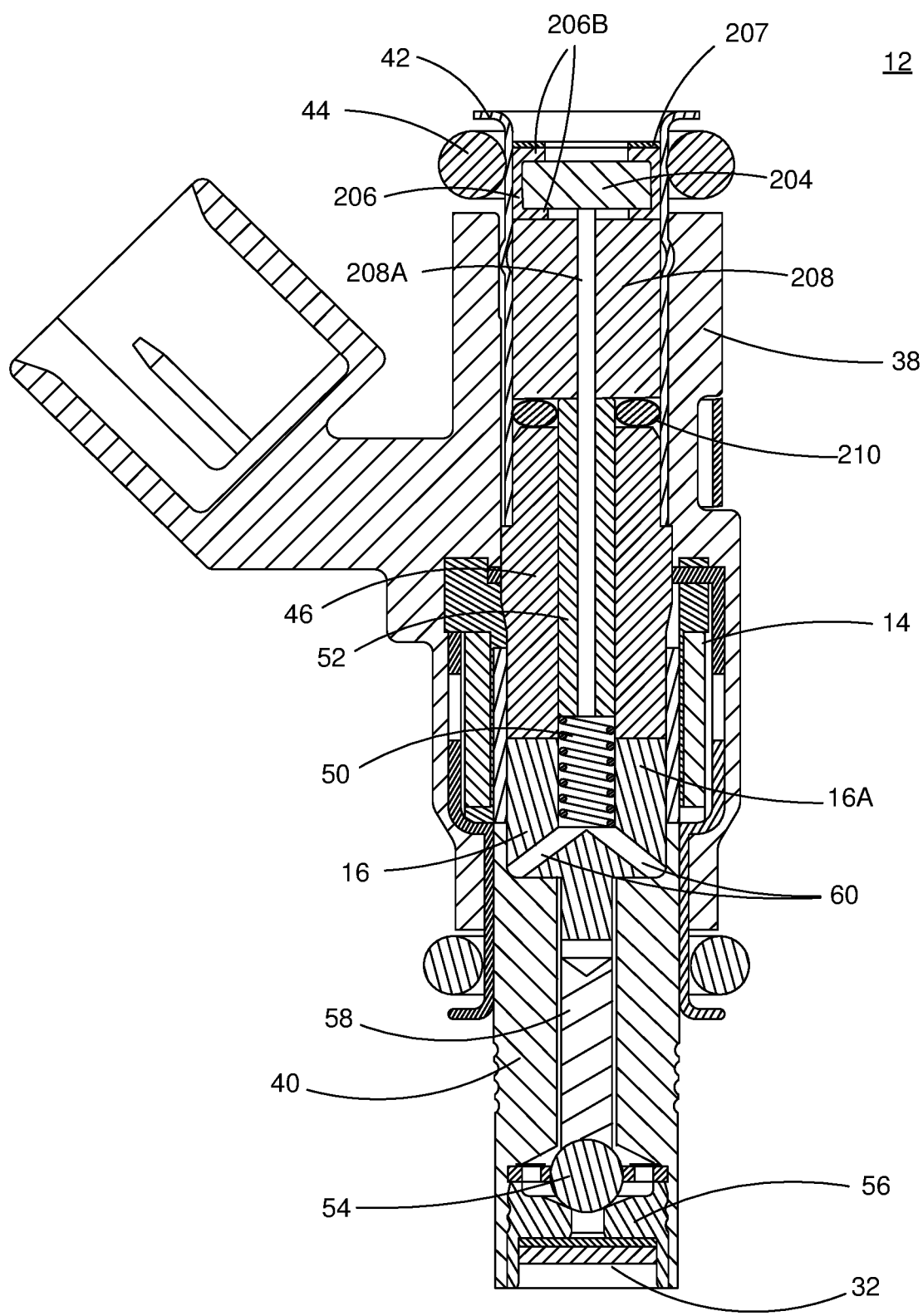
FIG. 2 is a cross-sectional side view of a fluid injector of the RDU of FIG. 1.

FIG. 1 illustrates an RDU 10 of a non-purge SCR system according to an example embodiment. RDU 10 includes a solenoid fluid injector, generally indicated at 12, that provides a metering function of fluid and provides the spray preparation of the fluid into the exhaust path of a vehicle in a dosing application. Thus, fluid injector 12 is constructed and arranged to be associated with an exhaust gas flow path upstream of a selective catalytic reduction (SCR) catalytic converter (not shown). Fluid injector 12 may be an electrically operated, solenoid fuel injector. As shown in FIGS. 1 and 2, fluid injector 12 includes an actuator unit having a coil 14 and a movable armature 16. Components of injector 12 define a fluid path for a reductant, DEF and/or urea solution through injector 12. The reductant, DEF and/or urea solution which RDU 10 is configured to inject into the exhaust path of a vehicle engine will be hereinafter referred to as "reductant" for simplicity.

Fluid injector 12 is disposed in an interior carrier 18 of RDU 10, as shown in FIG. 1. An injector shield, generally indicated at 20, is formed by upper shield 20A and lower shield 20B, which surround injector 12 and are coupled to carrier 18 by folding tangs of a flange 22 of lower shield 20B over shelf features of carrier 18 and upper shield 20A. As a result, shield 20 and carrier 18 are fixed with respect to injector 12.

An inlet cup structure of RDU 10, generally indicated at 24 in FIG. 1, includes a cup 26 and a fluid supply tube 28 integrally formed with cup 26. Fluid supply tube 28 is in communication with a source of a reductant (not shown) that is fed into a fluid inlet 30 of injector 12 for ejection from a fluid outlet 32 thereof and into the exhaust stream of a vehicle engine (not shown). Fluid inlet 30 of injector 12 is in fluid communication with fluid supply tube 28. Fluid outlet 32 is fluidly connected with a flange outlet 34 of an exhaust flange 36 that is coupled directly with an end of lower shield 20B of RDU 10.

Injector 12 includes an injector body structure in which the components of injector 12 are disposed. The injector body structure includes a first injector body portion 38 in which coil 14 and armature 16 are disposed, and a valve body portion 40 in which a valve assembly of injector 12 is at least partly disposed. First injector body portion 38 and valve body portion 40 are fixedly connected, either directly or indirectly, to each other.

Figure 3:
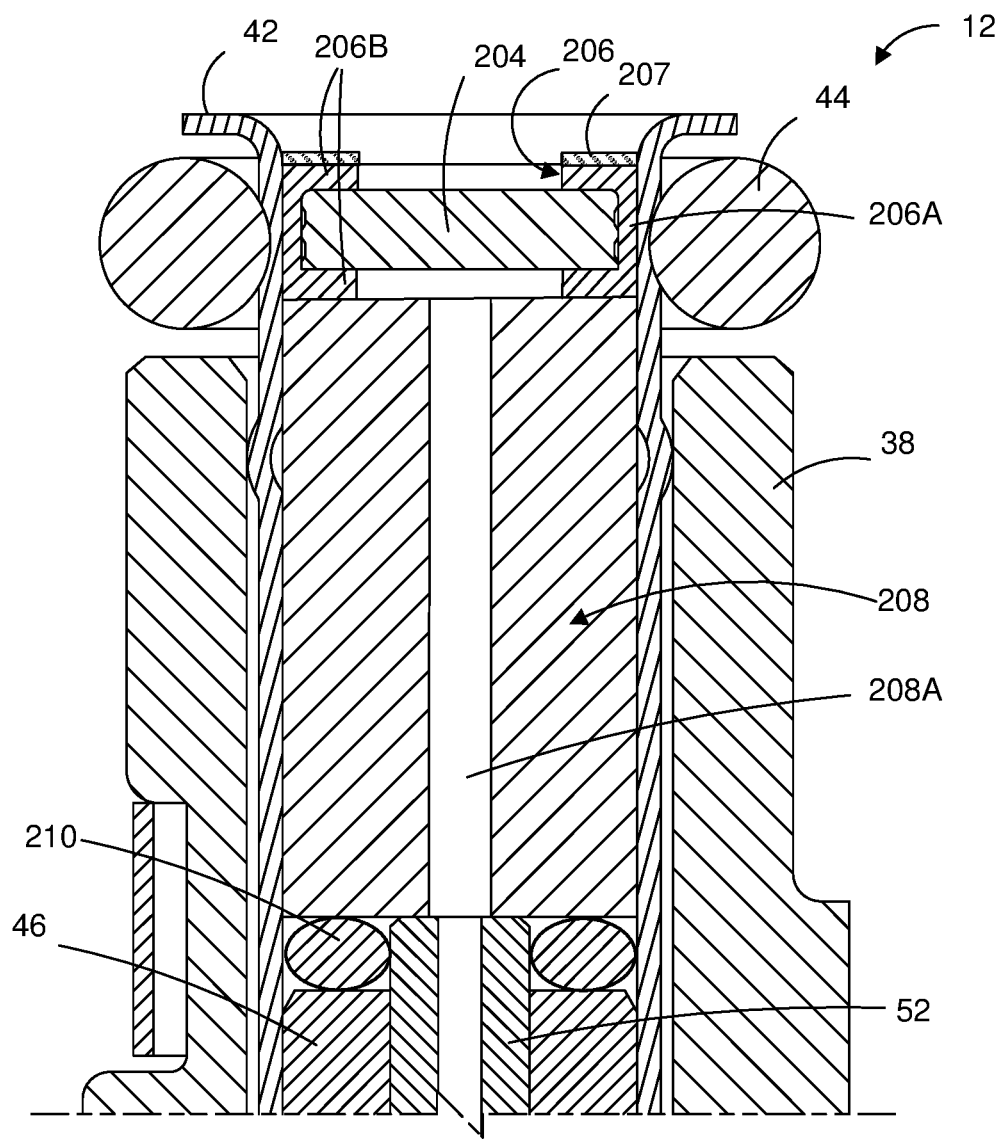
FIG. 3 is a magnified cross-sectional view of the inlet portion of the fluid injector of the RDU of FIG. 1 according to an example embodiment.

Referring to FIGS. 1-3, fluid injector 12 includes a tube member 42 which is at least partly disposed within first injector body portion 38. The outer surface of tube member 42 contacts the inner surface of first injector body portion 38. An open end of tube member 42 is disposed within cup 26 and is in fluid communication with fluid supply tube 28. An O-ring 44 is disposed within cup 26, between an inner surface thereof and the outer surface of tube member 42, proximal to the open end of tube member 42. O-ring 44 serves to ensure that reductant exiting fluid supply tube 28 passes into the open end of tube member 42 of injector 12.

The actuator unit of fluid injector 12 further includes a pole piece 46 which is fixedly disposed within first injector body portion 38. Coil 14 at least partly surrounds pole piece 46 and armature 16. Pole piece 46 is disposed upstream of armature 16 within injector 12. Pole piece 46 includes a central bore defined axially therethrough.

Armature 16 includes a U-shaped section which defines a pocket in which at least part of a spring 50 is disposed. Spring 50, which is part of the actuator unit, biases movable armature 16 so that armature 16 is spaced apart from pole piece 46 when no current is passed through coil 14. Spring 50 partly extends within the central bore of pole piece 46. An end of spring 50 which extends within pole piece 46 contacts a spring adjustment tube 52. Spring adjustment tube 52 is at least partly disposed within the central bore of pole piece 46, upstream (relative to a direction of flow of reductant through injector 12) of spring 50. Spring adjustment tube 52 includes a bore defined axially therethrough. The throughbore of spring adjustment tube 52 partly defines the fluid path for reductant in fluid injector 12, and defines the only fluid path for reductant through pole piece 46. Due to its engagement with spring 50, spring adjustment tube 52 is used to calibrate the dynamic flow of reductant through fluid injector 12.

Armature 16 further includes one or more channels 60 (FIGS. 1 and 2) defined through the armature 16 from an interior of the pocket to an upstream end portion of pin member 58. Channels 60 may be equally spaced about armature 16. In an example embodiment, armature 16 includes a single channel which is defined entirely around the base of the pocket formed by pocket wall 16A. Channel(s) 60 allows reductant to flow from the pocket of armature 16 to the space around the upstream end of pin member 58. The pocket of armature 16 and the channel(s) 60 together partly define the reductant fluid path of the fluid injector 12 and define the only part of the fluid path passing through or around armature 16.

Figure 5:
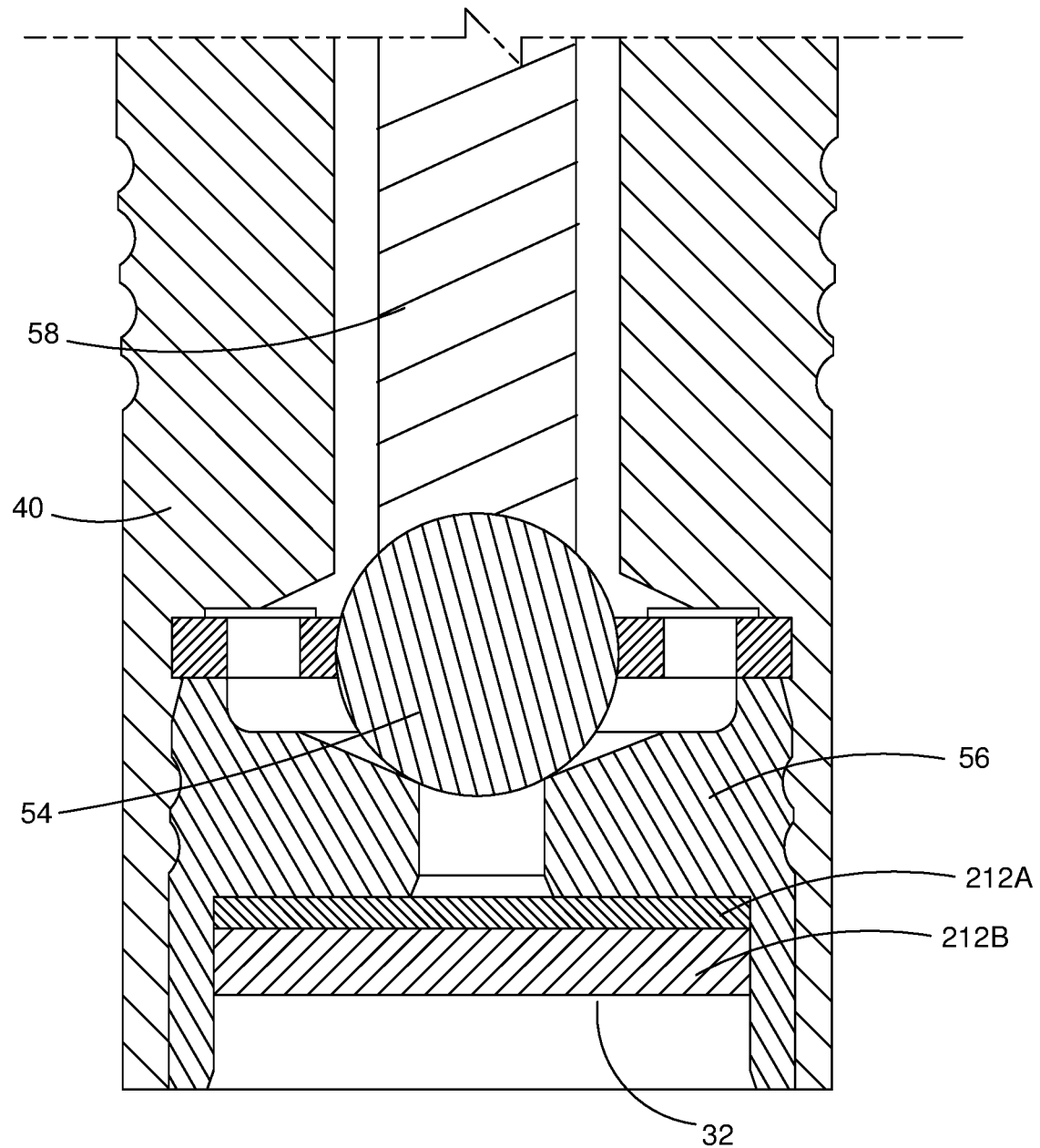
FIG. 5 is a magnified cross-sectional view of the outlet portion of the fluid injector of the RDU of FIG. 1 according to an example embodiment.

Referring to FIGS. 1, 2 and 5, the valve assembly of injector 12 includes a seal member 54 and a seat 56. Seal member 54 is connected to armature 16 via a pin member 58, which is disposed between seal member 54 and the downstream end of armature 16. Seal member 54, pin member 58 and armature 16 may combine to form an armature assembly. When coil 14 is energized, coil 14 generates an electromagnetic force acting on armature 16 which overcomes the bias force from spring 50 and causes armature 16 to move towards pole piece 46, which correspondingly moves pin member 58 so that seal member 54 is lifted off of, and disengages from, seat 56, moving the armature assembly to an open position and thus permitting reductant to pass through fluid outlet 32 to flange outlet 34 and into the exhaust path of the vehicle engine. When coil 14 is de-energized, the electromagnetic force dissipates and spring 50 biases armature 16 so that armature 16 is moved away from pole piece 46, resulting in seal member 54 sealingly engaging with seat 56, changing the armature assembly back to a closed position. With the armature assembly in the closed position, reductant is prevented from flowing through seat 56 and flange outlet 34 and into the exhaust path of the vehicle engine.

As mentioned above, RDU 10 forms part of a non-purge SCR exhaust aftertreatment system. As a result, reductant remains in fluid injector 12 following the vehicle engine being turned off. In example embodiments, fluid injector 12 is configured so that the amount of reductant in fluid injector 12 is reduced. In other words, the total volume of the fluid path for reductant through fluid injector 12 is reduced. By having less space for reductant in injector 12, the amount of reductant in RDU 10 that may potentially freeze is reduced, thereby reducing the susceptibility of injector 12 being damaged by expansion forces from frozen reductant.

In order to reduce the volume of the reductant fluid path in fluid injector 12, the thickness of valve body portion 40 is increased. In addition, pin member 58 is constructed as a solid element such that reductant flows around the outer surface of pin member 58, instead of therethrough. The spacing between the outer surface of pin 58 and the inner surface of valve body portion 40, which partly defines the fluid path for reductant through injector 12, is narrowed. This narrowed portion of the fluid path is the only fluid path for reductant between armature 16 and seat 56 in fluid injector 12. The narrowed fluid path between pin 58 and valve body portion 40 provides a sufficient reductant flow rate through fluid injector 12 for performing reductant injection during normal operation of RDU 10 while at the same time maintaining a relatively small volume of reductant within injector 12 so as to lessen the risk of injector 12 being damage from the reductant therein freezing.

Further, the diameter of the pocket of armature 16, in which spring 50 is at least partly disposed, is reduced, which allows for the thickness of pocket wall 16A of armature 16 to be increased. In an example embodiment, the thickness of pocket wall 16A is between 45% and 75% of the diameter of pocket, such as about 60%. The increase in thickness of pocket wall 16A, as well as the increased thickness of valve body portion 40 and pin member 50 being a solid pin, result in the components of injector 12 being strengthened and thus more resistant to reductant freezing forces.

Still further, the bore of spring adjustment tube 52 is sized for reducing the volume of the reductant fluid path in injector 12. In an example embodiment, the diameter of the bore of spring adjustment tube 52 is between 12% and 22% of the outer diameter of pole piece 46, and particularly between 16% and 19% thereof.

FIG. 3 illustrates an upstream portion of injector 12. Tube member 42 extends at least partly though injector 12. The reductant fluid path through injector 12 passes through tube member 42. Injector 12 includes a filter 204 disposed within tube member 42 proximal to the open end thereof. Filter 204 is a structurally rigid, sintered metal filter, such as a stainless steel material, in order to better withstand expansion forces from reductant freezing. Filter 204 may have a supporting outer structure for added strength. Best seen in FIG. 3, filter 204 is disposed within a cap member 206. Cap member 206 is largely cylindrically shaped having a sidewall 206A extending circumferentially and defining an inner volume sized for receiving filter 204 therein. Cap member 206 is dimensioned to fit within tube member 42, and particularly so that the outer surface of sidewall 206A of cap member 206 contacts the inner surface of tube member 42. Cap member 206 further includes annular members 206B disposed along the axial ends of cap member 206 and extend radially inwardly from sidewall 206A. Annular members 206B serve to maintain filter 204 within cap member 206 in a fixed position. Cap member 206 is constructed of metal or like compositions.

Injector 12 further includes a retaining ring 207 which is disposed in tube member 42 upstream of, and in contact with, cap member 206, as shown in FIGS. 1-3. Retainer ring 207 is fixed to tube member 42 along an inner surface thereof. Retainer ring 207 being fixed in position along tube member 42 serves to maintain downstream components of injector 12 in fixed positions within first injector body portion 38. In an example embodiment, retainer ring 207 is welded along the inner surface of tube member 42. Such weld connection is formed along an entire circumference of the upper edge of retainer ring 207. It is understood, however, that other connection mechanisms may be utilized for fixing retainer ring 207 to tube member 42.

Figure 4:
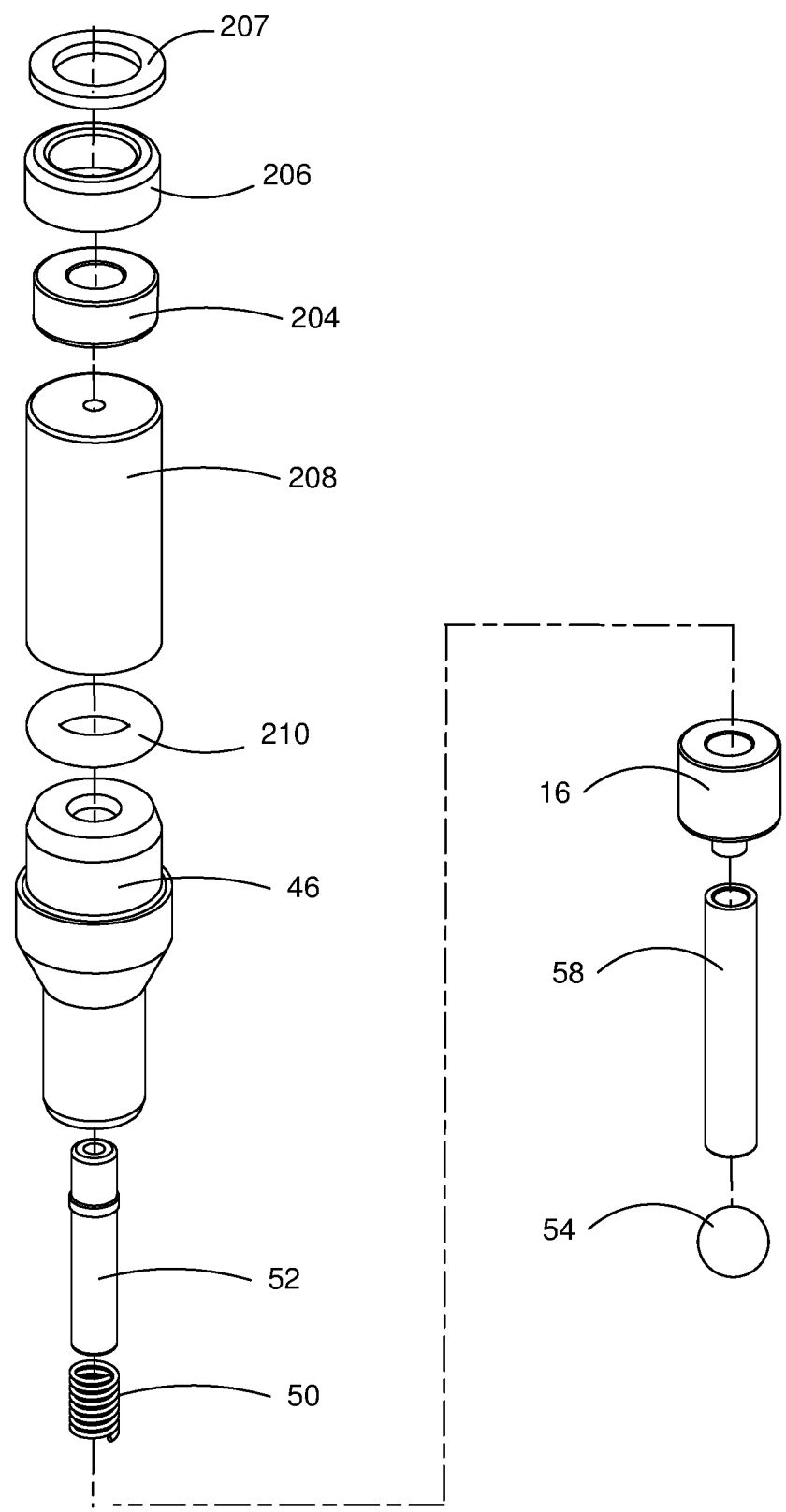
FIG. 4 is an exploded perspective view of components of the fluid injector of the RDU of FIG. 1 according to an example embodiment.

Referring to FIGS. 1-4, injector 12 further includes a volume reduction member 208 which serves to further reduce the volume of the reductant fluid path within injector 12. Reduction member 208 is largely cylindrical in shape, as shown in FIG. 4, having a top (upstream) end and a bottom (downstream) end. In an embodiment, volume reduction member 208 is constructed from a metal, such as stainless steel. It is understood, though, that volume reduction member 208 may be formed from other metals or metal compositions. The outer surface of volume reduction member 208 is sized to contact the inner surface of tube member 42.

Volume reduction member 208 further includes a bore 208A (FIGS. 2 and 3) defined in the axial direction through volume rejection member 208, from one axial (top) end to the other axial (bottom) end. Bore 208A is located along the longitudinal axis of volume reduction member 208 and itself forms part of the fluid path for passing reductant through injector 12. Bore 208A forms the only fluid path for passing reductant through or around volume reduction member 208. In an example embodiment, the diameter of bore 208A is between 12% and 20% of the outer diameter of volume reduction member 208, such as about 16%. Because volume reduction member 208 extends radially to the inner surface of tube member 42, and because the diameter of bore 208A is small relative to the outer diameter of volume reduction member 208, volume reduction member 208 reduces the space or volume in which reductant may reside within injector 12, thereby reducing the volume of the fluid path of reductant therein. Volume reduction member 208 further assists in retaining spring adjustment tube 52 in position within injector 12 such that pin adjustment tube 52 maintains a desired force on spring 50 so as to prevent a loss of calibration. Specifically, retainer ring 207 maintains the position of filter 204 and corresponding cap member 206, which maintain the position of volume reduction member 208, which maintains the position of spring adjustment member 52.

With reference to FIGS. 1-4, fluid injector 12 further includes a volume compensation member 210 which is disposed between the bottom (downstream) end of volume reduction member 208 and the top of pole piece 46. Volume compensation member 210 is constructed from elastic material and serves to occupy the space between volume reduction member 208 and pole piece 46 so as to further lessen the volume of the reductant fluid path in injector 12. Volume compensation member 210 may be in a compressed state in injector 12 when assembled, and contact the volume reduction member 208, pole piece 46, the inner surface of tube member 42 and the outer surface of spring adjustment member 52.

FIG. 5 illustrates a downstream end portion of fluid injector 12. As can be seen, seat 56 includes a bore defined axially through seat 56. In an example embodiment, the length of the throughbore of seat 56 is reduced so as to further reduce the volume of the reductant fluid path through seat 56, and particularly the sac volume below the sealing band of seat 56 which engages with seal member 54.

According to an example embodiment, fluid injector 12 includes a plurality of orifice discs 212 disposed in a stacked arrangement. The orifice disc stack is disposed against the downstream end of seat 56. In the example embodiment illustrated in FIG. 5, the disc stack includes a first disc 212A having one or more orifices that are configured for providing the desired spray pattern of reductant exiting injector 12. It is understood that the dimension and locations of the orifices of first disc 212A may vary and be dependent upon the reductant dosing requirements of the particular vehicle engine. The disc stack further includes a second disc 212B which is disposed downstream of first disc 212A and includes orifices through which the reductant spray passes. Second disc 212B has a larger thickness than the thickness of first disc 212A and being disposed against first disc 212A, and supports first disc 212A so as to prevent the thinner first disc 212A from deforming due to expansion forces from frozen reductant upstream of first disc 212A.

As discussed above, fluid injector 12, and particularly the components thereof, are configured to reduce the volume of the reductant fluid path in injector 12. In example embodiments, the ratio of the volume of the fluid path in fluid injector 12 to a volume of the components of injector 12 (including but not necessarily limited to coil 14, armature 16, pole piece 46, spring adjustment tube 52, volume reduction member 208, volume compensation member 210, filter 204, retaining ring 207, spring 50, pin member 58, seal member 54, seat 56, first injector body portion 20A and valve body portion 40) is between 0.08 and 0.30, and particularly between 0.12 and 0.20, such as about 0.15. These volume amounts are calculated between orthogonal planes relative to the longitudinal axis of fluid injector 12—from a first plane along the open end of tube member 42 (i.e., fluid inlet 30) and a second plane along the lowermost (downstream) surface of second disc 212B (i.e., fluid outlet 32). It is understood that the particular ratio of volume of the reductant path to injector component volume within fluid injector 12 may vary depending upon a number of cost and performance related factors, and may be any value between about 0.08 and about 0.30. Providing a fluid injector having a reduced ratio of reductant fluid path volume to injector component volume to fall within the above range advantageously results in less reductant in injector 12 which reduces the susceptibility of RDU 10 being damaged if the reductant in injector 12 freezes.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A reductant delivery unit, comprising:
a fluid injector having a fluid inlet disposed at a first end of the fluid injector for receiving a reductant, and a fluid outlet disposed at a second end of the fluid injector for discharging the reductant, the fluid injector defining a fluid path from the fluid inlet to the fluid outlet, the fluid injector comprising:
an actuator unit, including a pole piece disposed in a fixed position within the fluid injector, a movable armature and a coil disposed in proximity to the pole piece and the movable armature;
a valve assembly comprising a valve seat disposed at or in proximity with the second end of the fluid injector and a seal member connected to the armature and engageable with the valve seat;
a volume reduction member disposed between the actuator unit and the fluid inlet, the volume reduction member including a bore defined through the volume reduction member, the bore partly defining the fluid path through the fluid injector; and
one or more body portions in which the actuator unit, the valve assembly and the volume reduction member are disposed,
wherein each of the actuator unit, the valve assembly, the volume reduction member and the one or more body portions comprises one or more components of the fluid injector, and a ratio of a volume of the fluid path in the fluid injector to a volume of the components of the fluid injector is between 0.08 and 0.3, wherein the actuator unit further comprises a spring having a first longitudinal end contacting the armature and a second longitudinal end, and a spring adjustment member having a first end contacting the second longitudinal end of the spring and a second end contacting a downstream end of the volume reduction member, the spring adjustment member including a throughbore partly defining the fluid path of the fluid injector, and wherein the fluid injector further comprises an elastic member disposed between and contacting the volume reduction member and the pole piece, the elastic member being constructed from compressible material and is in a compressed state between the pole piece and the volume reduction member.

2. The reductant delivery unit of claim 1, wherein the armature assembly further comprises a pin member connected between the armature and the seal member of the valve assembly, and the one or more body portions comprises a valve body portion in which the valve assembly is at least partly disposed, an outer surface of the pin member and an inner surface of the valve body portion partly define the fluid path of the fluid injector, the fluid path not passing through the pin member.

3. The reductant delivery unit of claim 2, wherein the pin member includes an upstream end portion and a downstream end portion, relative to a direction of reductant flow in the fluid path of the fluid injector, and the armature includes a pocket and one or more channels defined through the armature from an interior of the pocket to the upstream end portion of the pin member, the pocket and the one or more channels defining the fluid path of the fluid injector through the armature, a location of an upstream end of the one or more channels at the pocket being radially inwardly disposed relative to a location a downstream end of the one or more channels at the upstream end portion of the pin member, the location of the downstream end of the one or more channels being disposed radially outwardly from the upstream end portion of the pin member.

4. The reductant delivery unit of claim 3, wherein the first longitudinal end of the spring is disposed at least partly in the pocket of the armature.

5. The reductant delivery unit of claim 4, wherein the bore of the volume reduction member being in fluid communication with the throughbore of the spring adjustment member.

6. The reductant delivery unit of claim 1, wherein the fluid injector further comprises a filter disposed between the fluid inlet and the volume reduction member, a retaining ring disposed upstream of the filter, the filter and the retaining ring comprising components of the fluid injector, and a tube member in which the filter and volume reduction member are disposed, the retaining ring being welded to the tube member.

7. The reductant delivery unit of claim 6, further comprising a cap member which surrounds a radial outer portion of the filter, the retaining ring being upstream of the cap member and in contact with a most upstream surface of the cap member.

8. The reductant delivery unit of claim 1, wherein the ratio of the volume of the fluid path to the volume of the components of the fluid injector is between 0.12 and 0.20.

9. The reductant delivery unit of claim 1, wherein the elastic member surrounds a portion of the spring adjustment member and contacts the spring adjustment member portion.

10. A fluid injector, comprising:
a fluid inlet disposed at a first end of the fluid injector for receiving a fluid, and a fluid outlet disposed at a second end of the fluid injector from which the fluid exits the fluid injector, the fluid injector defining a fluid path from the fluid inlet to the fluid outlet;

an actuator unit, including a pole piece disposed in a fixed position within the fluid injector, a movable armature and a coil disposed in proximity to the pole piece and the movable armature;

a valve assembly comprising a valve seat disposed at or in proximity with the second end of the fluid injector and a seal member connected to the armature and engageable with the valve seat;

a volume reduction member disposed between the actuator unit and the fluid inlet, the volume reduction member including a bore defined through the volume reduction member, the bore partly defining the fluid path through the fluid injector; and one or more body portions in which the actuator unit, the valve assembly and the volume reduction member are disposed, wherein each of the actuator unit, the valve assembly, the volume reduction member and the one or more body portions comprising one or more components of the fluid injector, and a ratio of a volume of the fluid path to a volume of the components of the fluid injector is between 0.08 and 0.30, wherein the actuator unit further comprises a spring having a first longitudinal end contacting the armature and a second longitudinal end, and a spring adjustment member having a first end contacting the spring and a second end contacting a downstream end of the volume reduction member, the spring adjustment member including a throughbore partly defining the fluid path of the fluid injector, and wherein the fluid injector further comprises an elastic member disposed between and contacting the volume reduction member and the pole piece, the elastic member being constructed from compressible material and is in a compressed state between the pole piece and the volume reduction member, the elastic member surrounding a portion of the spring adjustment member and contacting the spring adjustment member portion.

11. The fluid injector of claim 10, wherein the armature assembly further comprises a pin member connected between the armature and the seal member of the valve assembly, and the one or more body portions comprises a valve body portion in which the valve assembly is at least partly disposed, an outer surface of the pin member and an inner surface of the valve body portion defines part of the fluid path of the fluid injector, the fluid path not passing through the pin member.

12. The fluid injector of claim 11, wherein the pin member includes an upstream end portion and a downstream end portion, relative to the fluid path of the fluid injector, and the armature includes one or more channels defined through the armature so as to provide fluid to the upstream end portion of the pin member, the one or more the channels partly defining the fluid path of the fluid injector, a location of the one or more channels at the pocket being radially inwardly disposed relative to a location of the one or more channels at the upstream end portion of the pin member, the second location being disposed radially outwardly from the upstream end portion of the pin member.

13. The fluid injector of claim 10, wherein the bore of the volume reduction member is in fluid communication with the throughbore of the spring adjustment member.

14. The fluid injector of claim 10, wherein the fluid injector further comprises a filter disposed between the fluid inlet and the volume reduction member, a retaining ring disposed upstream of the filter, the filter and the retaining ring comprising components of the fluid injector, and a tube member in which the filter and volume reduction member are disposed, the retaining ring being welded to the tube member.

15. The fluid injector of claim 10, wherein the fluid injector is disposed in and forms part of a reductant delivery unit.

16. The fluid injector of claim 10, wherein the ratio of the volume of the fluid path to the volume of the components of the fluid injector is between 0.12 and 0.20.

17. The fluid injector of claim 10, further comprising a cap member which surrounds a radial outer portion of the filter and holds the filter in place within the fluid injector, the retaining ring being upstream of the cap member and in contact with a most upstream surface of the cap member.

18. A fluid injector for a reductant delivery unit, comprising:
- a fluid inlet disposed at a first end of the fluid injector for receiving a reductant, and a fluid outlet disposed at a second end of the fluid injector from which the reductant exits the fluid injector, the fluid injector defining a fluid path from the fluid inlet to the fluid outlet;
- an actuator unit, including a pole piece disposed in a fixed position within the fluid injector, a movable armature and a coil disposed in proximity to the pole piece and the movable armature;
- a valve assembly comprising a valve seat disposed at or in proximity with the second end of the fluid injector and a seal member connected to the armature and engageable with the valve seat;
- a volume reduction member disposed between the actuator unit and the fluid inlet, the volume reduction member including a bore defined through the volume reduction member, the bore partly defining the fluid path through the fluid injector; and
- one or more body portions in which the actuator unit, the valve assembly and the volume reduction member are disposed, wherein the actuator unit further comprises a spring having a first longitudinal end contacting the armature and a second longitudinal end, and a spring adjustment member having a first end contacting the spring and a second end contacting a downstream end of the volume reduction member, the spring adjustment member including a throughbore partly defining the fluid path of the fluid injector, wherein the fluid injector further comprises an elastic member disposed between and contacting the volume reduction member and the pole piece, the elastic member being constructed from compressible material and is in a compressed state between the pole piece and the volume reduction member, the elastic member surrounding a portion of the spring adjustment member and contacting the spring adjustment member portion.

19. The fluid injector of claim 18, wherein each of the actuator unit, the valve assembly, the volume reduction member and the one or more body portions comprising one or more components of the fluid injector, and a ratio of a volume of the fluid path to a volume of the components of the fluid injector is between 0.08 and 0.30.

20. The fluid injector of claim 18, further comprising:
- a filter disposed between the fluid inlet and the volume reduction member;
- a retaining ring disposed upstream of the filter, the filter and the retaining ring comprising components of the fluid injector;
- a tube member in which the filter and volume reduction member are disposed, the retaining ring being welded to the tube member; and
- a cap member which surrounds a radial outer portion of the filter and holds the filter in place within the fluid injector, the retaining ring being upstream of the cap member and in contact with a most upstream surface of the cap member.

* * * * *